United States Patent
Park et al.

(10) Patent No.: US 10,059,864 B2
(45) Date of Patent: Aug. 28, 2018

(54) PHASE-CHANGE MATERIAL SUSPENSION FLUID COMPOSITION INCLUDING FUMED SILICA PARTICLES AND METHOD FOR PREPARING THE SAME

(71) Applicant: Hyundai Motor Company, Seoul (KR)

(72) Inventors: Jong Min Park, Incheon (KR); Jae Sik Seo, Seoul (KR); Kyung Mo Yang, Gyeonggi-do (KR); Dae Sung Chang, Gyeonggi-Do (KR); Hyoung Jin Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/664,942

(22) Filed: Jul. 31, 2017

(65) Prior Publication Data

US 2017/0349799 A1    Dec. 7, 2017

Related U.S. Application Data

(62) Division of application No. 14/570,564, filed on Dec. 15, 2014, now Pat. No. 9,719,003.

(30) Foreign Application Priority Data

Nov. 7, 2014    (KR) .......................... 10-2014-0154260

(51) Int. Cl.
*C09K 5/06* (2006.01)
*C08K 3/36* (2006.01)
(Continued)

(52) U.S. Cl.
CPC .................. *C09K 5/06* (2013.01); *C08K 3/36* (2013.01); *C10M 169/04* (2013.01);
(Continued)

(58) Field of Classification Search
None
See application file for complete search history.

(56) References Cited

U.S. PATENT DOCUMENTS 5,116,535 A * 5/1992 Cochrane ................ C03C 1/006
516/86
5,518,638 A    5/1996 Buil et al.
(Continued)

FOREIGN PATENT DOCUMENTS

JP    08-041455    2/1996
JP    2000-336155 A    12/2000
(Continued)

*Primary Examiner* — Melvin C Mayes
*Assistant Examiner* — Colette Nguyen
(74) *Attorney, Agent, or Firm* — Mintz Levin Cohn Ferris Glovsky and Popeo, P.C.; Peter F. Corless

(57) ABSTRACT

Disclosed are a suspension fluid and a method for preparing the suspension fluid. Particularly, the suspension fluid is prepared by dispersing fumed silica particles in a solvent that includes one or more compounds selected from the group consisting of ethylene glycol and propylene glycol, and water. The phase-change suspension fluid obtained from the present invention is a shear thickening fluid that have a constant Newtonian behavior at a low rate of shear or a low frequency band, and further have a non-Newtonian behavior as a solid-like suspension at a high rate of shear or a high frequency band due to an increase in viscosity. In addition, the phase-change suspension fluid may reversibly change its phase with vibration of a vehicle, thereby providing advantages of both of the hydro bushes and the solid type bushes.

3 Claims, 7 Drawing Sheets

(51) Int. Cl.
*C10M 169/04* (2006.01)
*C10M 171/00* (2006.01)
*C10M 173/02* (2006.01)
*C10M 177/00* (2006.01)

(52) U.S. Cl.
CPC ...... *C10M 171/001* (2013.01); *C10M 173/02* (2013.01); *C10M 177/00* (2013.01); *C10M 2201/105* (2013.01); *C10M 2207/0225* (2013.01); *C10N 2220/082* (2013.01); *C10N 2230/02* (2013.01); *C10N 2230/68* (2013.01)

(56) References Cited

U.S. PATENT DOCUMENTS

| | | |
|---|---|---|
| 6,248,144 B1 | 6/2001 | Tamai et al. |
| 6,429,134 B1 | 8/2002 | Kubota et al. |
| 6,824,700 B2 * | 11/2004 | Iyengar ............. H01F 1/447 |
| | | 252/62.52 |
| 8,062,541 B2 * | 11/2011 | Barber ............... H01F 1/447 |
| | | 252/62.52 |
| 8,062,548 B2 | 11/2011 | Ohta et al. |
| 8,329,778 B2 | 12/2012 | Dowel |
| 8,372,515 B2 | 2/2013 | Byrne et al. |
| 2004/0110870 A1 | 6/2004 | Liu |
| 2008/0138296 A1 * | 6/2008 | Tamarkin ............ A61K 8/046 |
| | | 424/47 |
| 2012/0034315 A1 | 2/2012 | Hanagan et al. |
| 2012/0099976 A1 | 4/2012 | Mickelsen et al. |
| 2012/0192740 A1 | 8/2012 | Miyazaki et al. |
| 2013/0062555 A1 * | 3/2013 | Olson ................. C09K 5/10 |
| | | 252/75 |

FOREIGN PATENT DOCUMENTS

| | | |
|---|---|---|
| KR | 2010-0125980 | 12/2010 |
| KR | 10-1234525 B1 | 2/2013 |
| WO | 01/85879 A1 | 11/2001 |
| WO | 2010040738 A1 | 4/2010 |

* cited by examiner

PHASE-CHANGE MATERIAL SUSPENSION FLUID COMPOSITION INCLUDING FUMED SILICA PARTICLES AND METHOD FOR PREPARING THE SAME

CROSS-REFERENCE TO RELATED APPLICATION

This application claims under 35 U.S.C. § 119(a) the benefit of Korean Patent Application No. 10-2014-0154260 filed on Nov. 7, 2014, the entire contents of which are incorporated herein by reference.

TECHNICAL FIELD

The present invention relates to a phase-change suspension fluid composition and a method for preparing the composition. In particular, the phase-change suspension fluid may be prepared by dispersing fumed silica particles having a particle size of about 7 to 14 nm in a solvent including one or more compounds selected from the group consisting of ethylene glycol and propylene glycol, and water.

BACKGROUND

The term, "phase-change fluid" generally refers to a fluid of which the mechanical and physical properties are changed by external force applied, for example, a shear thickening fluid (STF) and a shear thinning fluid.

The shear thickening fluid (STF) is composed of concentrated suspension colloid prepared by dispersing non-condensed solid particles in a fluid such that, at or beyond a critical shear rate, viscosity thereof may be substantially increased as described previously in Xianzhou Zhang, Weihua Li, Gong, X. L., smart mater. Struct., Vol. 17, 015051 (2008).

Moreover, at a high rate of shear, the viscosity of the shear thickening fluid (STF) may be increased to be solid-like suspension. When shock stress is removed, the shear thickening fluid (STF) may rapidly and reversibly return to be liquid-like state as described previously in Chang, L., Friedrich, K., Schlarb, A. K., Tanner, R., Ye, L., J Mater Sci, Vol. 46, 339-346 (2011).

Meanwhile, the viscosity of the shear thinning fluid may be reduced for ordinary flow with an increase in a rate of shear, and thus, the rate of shear of the shear thinning fluid may be inversely proportional to the viscosity.

Particularly, the phase-change fluid may be liquefied or be liquid-like due to a sharp decrease in the viscosity of nano particles at a high rate of shear. For example, the phase-change fluid may be dispersed in a solvent such as ethylene glycol (EG), propylene glycol (PG), ethylene glycol (EG)/water, or propylene glycol (PG)/water.

In the related arts, nano particles have been substantially studied due to its hydrocluster property between particles. However, the hydrocluster property or phenomenon between nano particles may have a substantial difference as compared with various models that are theologically proposed according to the size of particle. In addition, the phase-change fluid may have a change in viscosity and yield stress when external force is applied. Particularly, when such changes occur rapidly and reversible to the load of external force, it is referred to as a "phase-change effect". The phase-change fluid may be a Bingham fluid having yield stress, which is obtained as a function of the rate of shear.

The fluid having the phase-change effect may be applied for controllable variable attenuators, such as, brakes, engine mounts, dampers, and bushes, or the power plant, such as, brakes and clutches, and the field where the fluid may be applied has been expanded into a robot industry as well as a vehicle industry and an aircraft industry.

For example, fluid filled hydro hushes are conventional curing rubber parts, prepared by filling a fluid and then sealing, and thus, may provide improved riding quality due to the implement of spring-like characteristic by the combination of rubber elasticity and the fluid. However, these fluid filled hydro bushes may have technical difficulties. For example, a certain amount of fluid to be injected may not work sufficiently for variously changing vehicle driving states. In addition, when a conventional Newtonian fluid having no change in viscosity according to frequency or a rate of shear is used, the fluid moves along a fluid pathway and absorbs vibration and the hydro bushes that are filled with such fluid have been improved in riding quality. However, high-speed handling performance and durability may deteriorate.

Meanwhile, in the related arts, a fluid filled hydro bush that can control an amount of fluid to be injected has been developed. However, the fluid filled hydro bush may not have a simple constitution and thus manufacturing cost may increase and application to the vehicles may be limited.

In addition, generally used hydro hushes may be advantageous in loss coefficient in a low frequency band, in comparison to solid type bushes. However, their dynamic spring constants may increase substantially with an increase in frequency. Further, from the result of a vehicle driving test, those hydro bushes may have an effect of vibration isolation in a low frequency band, as compared with solid type bushes, but they may vibrate vertically excessively with an increase in frequency. Accordingly, the advantages of both of the hydro bushes and the solid type bushes may be required.

As such, a need for developing intelligent macromolecular dispersed fluid has been increased. For example, by developing a fluid that is filled in hydro bushes, the advantages of a hydro bush in a low frequency band and the advantages of a solid type bush in a high frequency band may be combined and reversible change of phase in accordance with vibration of a vehicle may be obtained.

The above information disclosed in this Background section is only for enhancement of understanding of the background of the invention and therefore it may contain information that does not form the prior art that is already known in this country to a person of ordinary skill in the art.

SUMMARY OF THE INVENTION

In a preferred aspect, the present invention provides a suspension fluid that is prepared by dispersing fumed silica particles having a particle size of 7 to 14 nm in a solvent. In particular, the solvent may include one or more compounds selected from the group consisting of ethylene glycol and propylene glycol, and water. Accordingly, the suspension fluid may be a shear thickening fluid that may have a constant Newtonian behavior at a low rate of shear or a low frequency hand and have a non-Newtonian behavior as a solid-like suspension by increasing a viscosity thereof at a high rate of shear or high frequency band. As such, the suspension fluid may have the advantage of hydro bush at a low frequency band and the advantage of solid type bush at a high frequency band.

In one aspect, provided is a phase-change suspension fluid composition that may include fumed silica particles.

In another aspect, provided is a method for preparing a phase-change suspension fluid.

Still in another aspect, provided is an automotive hydro bush for a vehicle that may include the phase-change suspension fluid having a viscosity of about 0.01 to 20 Pa·s, which is prepared according to the above method.

In an exemplary embodiment, the phase-change suspension fluid composition may include: fumed silica particles; and a solvent including one or more compounds selected from the group consisting of ethylene glycol and propylene glycol and water.

Particularly, the phase-change suspension fluid composition may include: the fumed silica particles in an amount of about 5 to 30 wt % and the solvent with respect to the total weight of the phase-change suspension fluid composition. The composition above may consist essentially of, or consist of, the disclosed materials. For example, a fluid composition is provided that consists essentially of, or consists of: the fumed silica particles in an amount of about 5 to 30 wt % and the balance of the solvent with respect to the total weight of the phase-change suspension fluid composition.

In an exemplary embodiment, the method for preparing the phase-change suspension fluid may include: (i) preparing a suspension fluid by mixing and dispersing fumed silica particles in a solvent; (ii) sonicating the suspension fluid; and (iii) removing air from the sonicated suspension fluid by placing the sonicated suspension fluid in a vacuum chamber. As used herein, the solvent may include one or more compounds selected from the group consisting of ethylene glycol and propylene glycol, and water In an exemplary embodiment, the hydro bush for a vehicle may include a phase-change suspension fluid having a viscosity of about 0.01 to 20 Pa·s, which is prepared according to the above method.

Further provides are vehicles that use the hydro bush as described herein.

Other aspects and preferred embodiments of the invention are discussed infra.

BRIEF DESCRIPTION OF THE DRAWINGS

The above and other behaviors of the present invention will now be described in detail with reference to certain exemplary embodiments thereof illustrated the accompanying drawings which are given hereinbelow by way of illustration only, and thus are not limitative of the present invention, and wherein:

FIG. 2A illustrates the storage modules, FIG. 2B shows the results of Comparative Example 1 and Example 1 using fumed silica having a particle size of about 7 nm, and II) of FIG. 2A or FIG. 2B shows the results of Comparative Example 2 and Example 2 using fumed silica having a particle size of about 14 nm;

Figure 1:
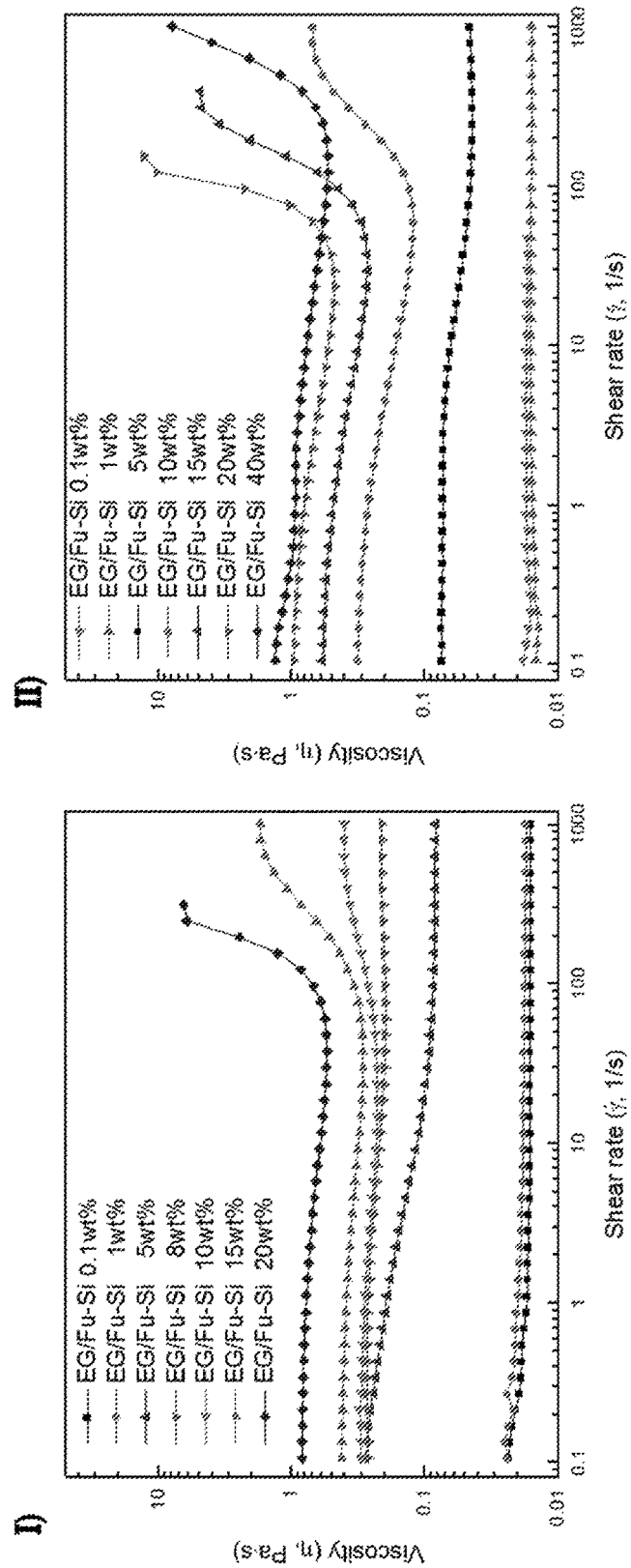
FIG. 1 shows graphs from test results of shear viscosities in accordance with the shear rates of exemplary phase-change fluids prepared in Comparative Examples 1 and 2 and Examples 1 and 2 according to exemplary embodiments of the present invention, where I) shows the results of Comparative Example 1 and Example 1 using fumed silica having a particle size of about 7 nm and II) shows the results of Comparative Example 2 and Example 2 using fumed silica having a particle size of about 14 nm.

It should be understood that the appended drawings are not necessarily to scale, presenting a somewhat simplified representation of various preferred behaviors illustrative of the basic principles of the invention. The specific design behaviors of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described in more detail with reference to one embodiment.

The phase-change suspension fluid composition may include: fumed silica particles; and a solvent including one or more compounds selected from the group consisting of ethylene glycol and propylene glycol and water.

In particular, the fumed silica particles used in the composition may be 'phase-change macromolecules' and the phase-change fluids may be formed as suspension fluid (suspension) by dispersing the phase-change macromolecules in a solvent including one or more compounds selected from the group consisting of ethylene glycol and propylene glycol, and water.

The ethylene glycol represented by Formula I and the propylene glycol represented by Formula II in the solvent may have a number average molecular weight of about 50 to 100.

$$HO-CH_2-CH_2-OH \quad \text{(Formula I)}$$

$$HO-CH_2-CH_2-CH_2-OH \quad \text{(Formula II)}$$

When the number average molecular weight is less than about 50, the content of low molecular weight impurities may increase, and thus, the purity of ethylene glycol may be reduced. When the number average molecular weight is greater than about 100, the purity of propylene glycol may be reduced. Accordingly, the glycols in the above-described range may be used in the composition.

In addition, the fumed silica may be crystallized at a high temperature of about 1100 to 1180° C. The reaction thereof may be presented as follows.

$$SiCl_4 + H_2 + O_4 \rightarrow SiO_2 + HCl \quad \text{[Reaction Formula]}$$

TABLE 1

| *Silica Properties | | | | | | | | | |
|---|---|---|---|---|---|---|---|---|---|
| | Aerosil 200 | Aerosil 300 | Aerosil 380 | Aerosil R812 | Aerosil R972 fumed | Aerosil R104 | Aerosil R106 | Carbosil M-6 | Carbosil TS-630 |
| Company | | | | Degussa-Huls | | | | Cabot | |
| Behaviour toward water | hydrophilic | | | hydrophobic | | | | hydrophilic | hydrophobic |
| Surface treated | — | — | — | HDMS | Dimethyl dichlorosilone | Octamethylcyclotetrasiloxane | | — | silicone oil and HMDS |
| $SiO_2$ content (% w/w) | >99.8 | >99.8 | >99.8 | >99.8 | >99.8 | >99.8 | >99.8 | >99.8 | >99.8 |
| Surface Area BET ($m^2/g$) | 200 | 300 | 380 | 260 | 110 | 150 | 250 | 200 | 215 |
| Average Primary Partial Size (nm) | 12 | 7 | 7 | 7 | 16 | 12 | 7 | | |
| Tapped Density (g/l) Standard Material | 60 | 60 | 60 | 60 | 60 | 60 | 60 | 60 | 60 |
| Densified Material (suffix,, v") | 120 | 120 | 120 | — | 90 | 90 | — | | |
| Loss on Drying (% w/w) Moisture content (2 hours at 106° C.) | <1.5 | <1.5 | <2.0 | <0.5 | <0.5 | — | — | <1.5 | 0.6 |
| Ignition Loss % (2 hours at 1000° C.) | <1 | <2 | <2.5 | <0.6 | <2 | | | <2 | — |
| pH value | | 3.4~3.7 | | 5.5~7.5 | 3.6~4.4 | >4.0 | >3.7 | 3.7~4.3 | 4.8~7.5 |
| C-content | — | — | — | 2.0~3.0 | 0.6~1.2 | 1~2 | 1.5~3.0 | — | 4.2 |
| Sieve residue % (W/W) (Mocker, >40°급￥) | <0.05 | <0.05 | <0.05 | — | — | — | — | 0.02 | — |
| Oil absorption (ml/100 g) | | | | | | | | | |

| | | HDK V 16 | HDK H2000 | HDK H3004 fumed | Reolosil MT-10 | Zeosil 132 precipitated | Nipsil LP |
|---|---|---|---|---|---|---|---|
| | Company | | Wacker | | Tokuyam | Rhodia | Nippon |
| | Behaviour toward water | hydrophilic | hydrophobic | | hydrophobic | | hydrophilic |
| | Surface treated | — | | | Methyltrichlosilone | | |
| | $SiO_2$ content (% w/w) | >99.8 | >99.8 | >99.8 | | | |
| | Surface Area BET ($m^2/g$) | 150 | 140 | 200 | 120 | | 170~220 |
| | Average Primary Partial Size (nm) | | | | | | 9000 |
| | Tapped Density (g/l) Standard Material | 50 | 220 | 80 | 50 | | 60~60 |

TABLE 1-continued

*Silica Properties

| | | | | | |
|---|---|---|---|---|---|
| Densified Material (suffix,, v″) | 110 | — | — | | |
| Loss on Drying (% w/w) Moisture content (2 hours at 106° C.) | <1.0 | <0.6 | <0.5 | | |
| Ignition Loss % (2 hours at 1000° C.) | <1.5 | <2.5 | <2.5 | | |
| pH value | 3.8~4.3 | 6.7~7.7 | 6.0~8.0 | 4.0~6.6 | 6.6~6.5 |
| C-content | — | <3.0 | <5.0 | | |
| Sieve residue % (W/W) (Mocker, >40°⌀) | | — | | <0.01 | |
| Oil absorption (ml/100 g) | | | | | 180~200 |

The above-described Table 1 lists commercially produced fumed silica. In particular, the fumed silica having a hydrophilic particle and a particle size of 7 to 14 nm may be used in the present invention. When the particle size is less than about 7 nm, the fumed silica may not be suitably prepared in the composition, and when the particle size is greater than about 14 nm, t a shear thickening phenomenon may not be generated. Accordingly, the fumed silica having a particle size in the above-described range may be used.

In addition, the fumed silica having a specific surface area of about 200 to 400 $m^2/g$ may be used in the composition and the method of the invention. When the specific surface area is less than about 200 $m^2/g$, t a particle size may not be distributed uniformly, and when the specific surface area is greater than about 400 $m^2/g$, the particles may agglomerate together to form size thereof greater than about 14 nm. Accordingly, the fumed silica having a specific surface area in the above-described range may be used.

The fumed silica particles may be used in the amount of about 5 to 30 wt % or particularly in the amount of about 5 to 20 wt %, with respect to the total weight of phase-change suspension fluid composition. When the fumed silica particles are included in the amount of less than about 5 wt %, a Newtonian behavior without generating a shear thickening phenomenon may be dominant. When the fumed silica particles are included in the amount of greater than about 30 wt %, the viscosity thereof may be substantially increased, and thus, it may not be suitably used for applying the particles as a fluid in the hydro bushes. Accordingly, the particles may be used in the composition in the amount of the above-described range.

The method for preparing a phase-change suspension fluid may include:

(i) preparing a suspension fluid by adding and dispersing fumed silica particles in a solvent including one or more compounds selected from the group consisting of ethylene glycol and propylene glycol, and water;

(ii) sonicating the suspension fluid obtained in the step (i); and (iii) removing air from the sonicated suspension fluid.

Particularly, in step (iii), the air may be removed from the sonicated suspension fluid by placing the sonicated suspension fluid in a vacuum chamber, but the method of removing air may not be limited thereto.

In the step of (i), the suspension fluid may be prepared by adding and dispersing fumed silica particles in a solvent that may include one or more compounds selected from the group consisting of ethylene glycol and propylene glycol, and water. Particularly, the prepared suspension fluid may be in a state that fine solid particles are dispersed and floating in the liquid.

Next, in the step of (ii), the suspension fluid prepared in the step of (i) may be sonicated, such that the fumed silica particles may be dispersed uniformly. In particular, the sonication may be performed for about 9 to 12 hours. When the sonication is performed for less than about 9 hours, the dispersion of the particles and fluid in the suspension fluid may not be sufficiently performed. When the sonication is performed for greater than about 12 hours, the preparation time may be increased. Accordingly, the sonication or the preparing process may be performed during the above-described range of time.

In the step of (iii), air may be removed from the sonicated suspension fluid, particularly by placing the sonicated suspension fluid in a vacuum chamber to remove air bubbles included in the fluid. The removing air process may be performed for about 9 to 12 hours. When this process is performed for less than about 9 hours, the air bubbles may not be sufficiently removed, and when this process is performed for greater than about 12 hours, the preparing time may be increased. Accordingly, the process of removing air may be performed during the time in the above-described range.

The phase-change suspension fluid thus prepared may have a constant Newtonian behavior at a low rate of shear or a low frequency band, and further may have a non-Newtonian behavior as a solid-like suspension by increasing its viscosity at a high rate of shear or a high frequency band. In particular, the phase-change suspension fluid may have a viscosity of about 0.01 to 20 Pa·s. When the phase-change suspension fluid has a viscosity of less than about 0.01 Pa·s, the difference of pure ethylene glycol or propylene glycol viscosity may not be generated. When the phase-change suspension fluid has a viscosity of greater than about 20 Pa·s, an injection may not be performed properly at the time of preparing a fluid to be filled. Accordingly, the phase-change suspension fluid may have the viscosity in the above-described range.

According to various exemplary embodiments of the present invention, the phase-change fluid may reversibly change the phase in accordance with vibration of a vehicle, and may be applied for controllable variable attenuators, such as, suspension systems, isolators, and engine mounts, or the power plant, such as, brakes and clutches.

Hereinafter, the present invention will be described in more detail with reference to Examples. However, these Examples are only for illustrating the present invention, but the present invention is not limited thereto.

EXAMPLES

The following examples illustrate the invention and are not intended to limit the same.

Example 1 and Comparative Example 1 (Silica Particle Size of about 7 nm)

Examples 1-1 to 1-6 and Comparative Examples 1-1 to 1-4

According to the composition ratio of the constituents listed in Table 2, the fumed silica having a particle size of about 7 nm was mixed in a solvent that was prepared by mixing ethylene glycol and water, and then resulting mixture was mechanically mixed using a blander for about 1 hour to prepare a suspension fluid. The ultrasonication was performed for about 12 hours so as to uniformly disperse the polyethylene oxide particles in such a suspension fluid, and then, the suspension fluid was added in a vacuum chamber to remove air bubbles, thereby preparing the phase-change suspension fluid.

TABLE 2

Composition and content of phase-change suspension fluid (unit: g)

| Item | Fumed silica | Ethylene glycol (EG) | Di-water |
|---|---|---|---|
| Example 1-1 | 1.06 (5 wt %) | 10 | 10 |
| Example 1-2 | 0.87 (8 wt %) | 10 | 10 |
| Example 1-3 | 2.22 (10 wt %) | 10 | 10 |
| Example 1-4 | 3.52 (15 wt %) | 10 | 10 |
| Example 1-5 | 5 (20 wt %) | 10 | 10 |
| Example 1-6 | 8.6 (30 wt %) | 10 | 10 |
| Com. Example 1-1 | 0.02 (0.1 wt %) | 10 | 10 |
| Com. Example 1-2 | 0.2 (1 wt %) | 10 | 10 |
| Com. Example 1-3 | 13.3 (40 wt %) | 10 | 10 |

Example 2 and Comparative Example 2 (Silica Particle Size of about 14 nm)

Examples 2-1 to 2-6 and Comparative Examples 2-1 to 2-4

The phase-change suspension fluids were prepared as described in Example 1 and Comparative Example 1, except that fumed silica having a particle size of about 14 nm was used.

TABLE 3

Composition and content of phase-change suspension fluid (unit: g)

| Item | Fumed silica | Ethylene glycol (EG) | Di-water |
|---|---|---|---|
| Example 2-1 | 1.06 (5 wt %) | 10 | 10 |
| Example 2-2 | 0.87 (8 wt %) | 10 | 10 |
| Example 2-3 | 2.22 (10 wt %) | 10 | 10 |
| Example 2-4 | 3.52 (15 wt %) | 10 | 10 |
| Example 2-5 | 5 (20 wt %) | 10 | 10 |
| Example 2-6 | 8.6 (30 wt %) | 10 | 10 |
| Com. Example 2-1 | 0.02 (0.1 wt %) | 10 | 10 |
| Com. Example 2-2 | 0.2 (1 wt %) | 10 | 10 |
| Com. Example 2-3 | 13.3 (40 wt %) | 10 | 10 |

Experimental Example

In order to measure the rheological behaviors of the phase-change suspension fluids obtained by Examples 1-1 to 2-6 and Comparative Examples 1-1 to 2-2, the viscosities and damping factors were obtained while shear rates and frequencies were adjusted using an instrument. The measurement geometry used was a double gap cell type, and the cup and bob were not applied with any kinds of external forces. In addition, in order to obtain the accuracy of the test results, the above process was performed after re-dispersing vibration fluid all the time. The above measurement results are illustrated in FIGS. 1 to 4. Hereinafter, the test results will be described in detail.

FIG. 1 shows graphs from the test results of shear viscosities in accordance with the shear rates of exemplary phase-change fluids prepared in Comparative Examples 1 and 2 and Examples 1 and 2 according to exemplary embodiments of the present invention. As shown in FIGS. 1 I and II, the Newtonian behavior of constant viscosity may be shown at a low rate of shear, the non-Newtonian behavior may be shown at a high rate of shear because the viscosity of a shear thickening fluid (STF) increases so as to be solid-like suspension.

Figure 2A:
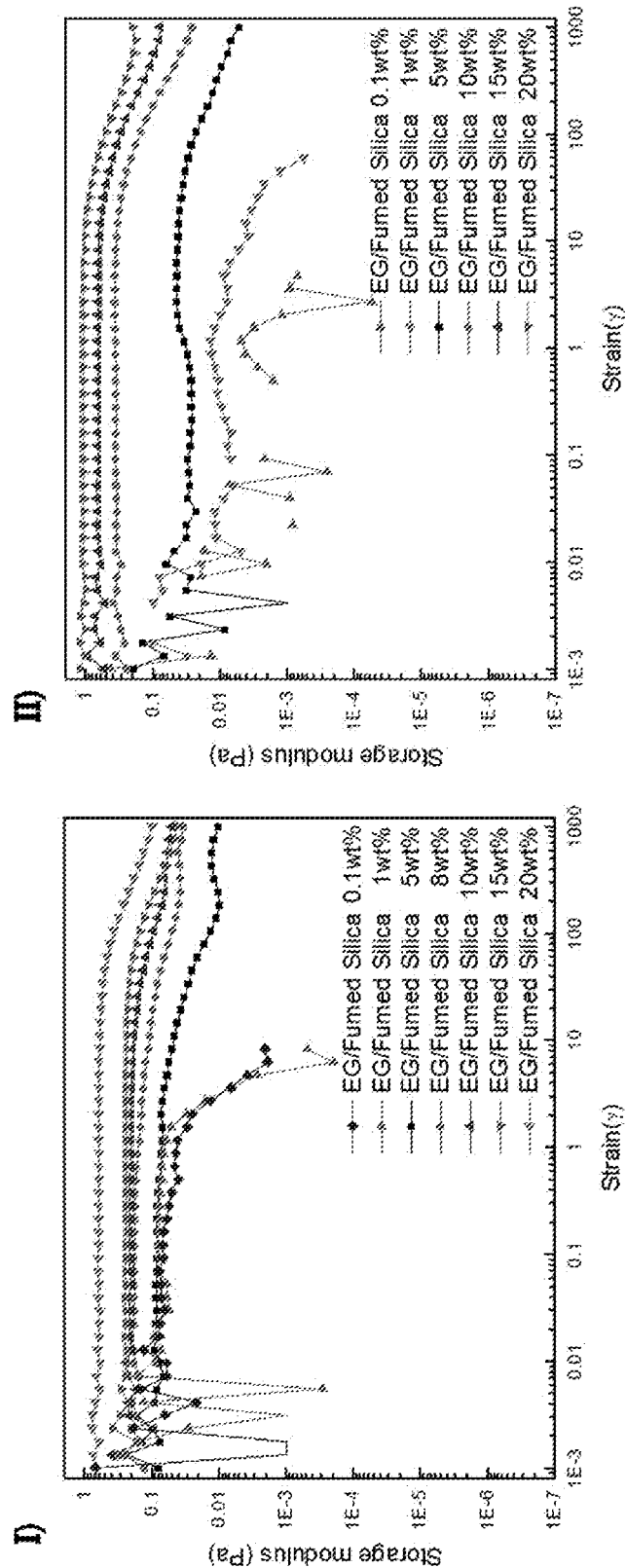
FIG. 2A shows graphs from test results of storage modulus and loss modulus in accordance with the strains of exemplary phase-change fluids prepared in Comparative Examples 1 and 2 and Examples 1 and 2 according to exemplary embodiments of the present invention, where
Figure 2B:
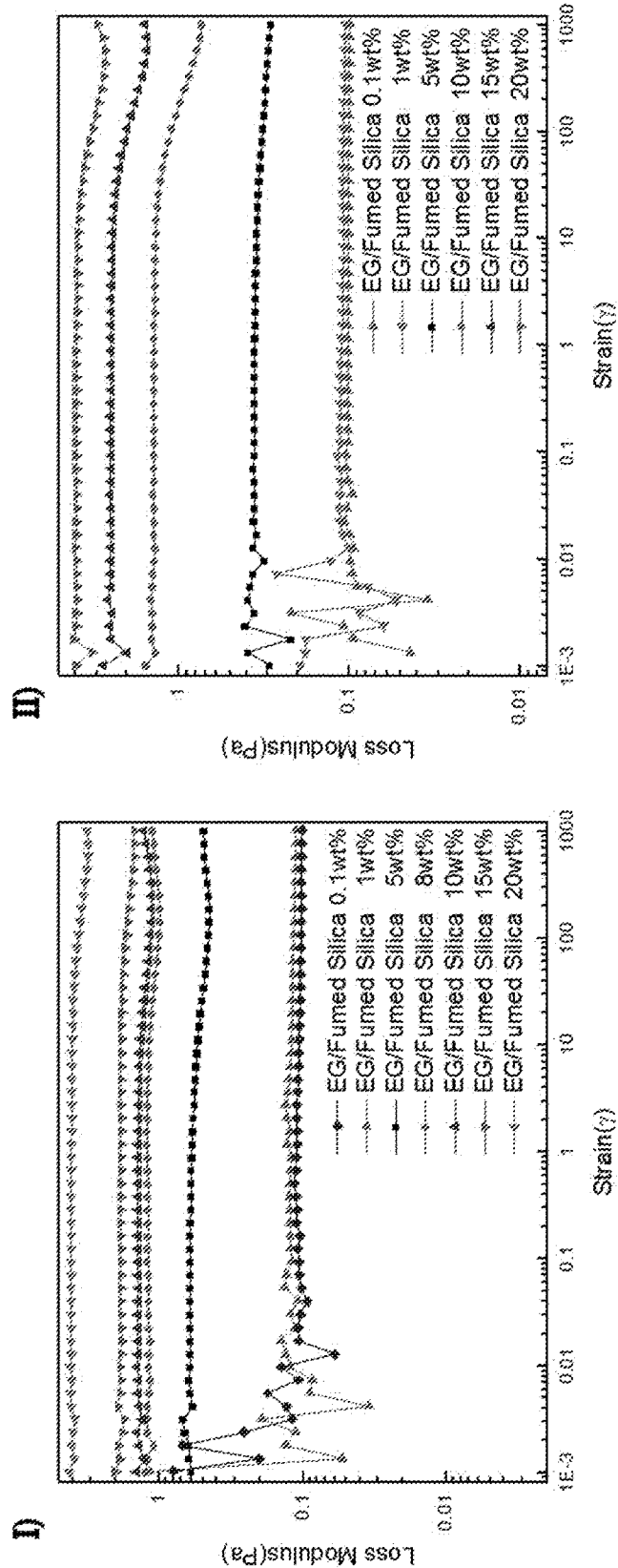
FIG. 2B illustrates the loss modulus, and particularly I) of FIG. 2A

FIG. 2 shows graphs from the test results of storage modulus and loss modulus in accordance with the strains of exemplary phase-change fluids prepared in Comparative Examples 1 and 2 and Examples 1 and 2 according to exemplary embodiments of the present invention. The modulus in accordance with the strain to the frequency of 1 Hz was shown. According to FIG. 2, a linear viscoelastic region may be shown.

Figure 3A:
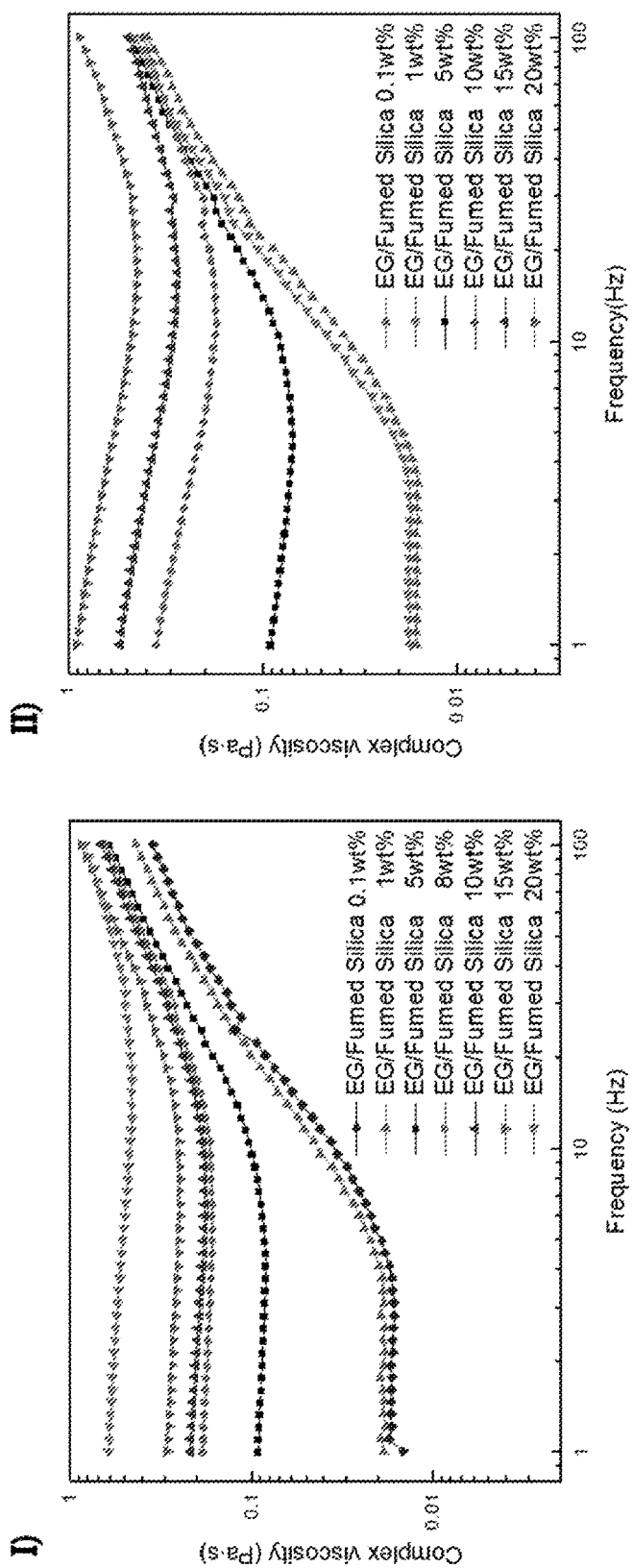
FIG. 3A shows graphs from test results of complex viscosities in accordance with the frequencies of exemplary phase-change fluids prepared in Comparative Examples 1 and 2 and Examples 1 and 2 according to exemplary embodiments of the present invention, where I) of FIG. 3A shows the results of Comparative Example 1 and Example 1 using fumed silica having a particle size of about 7 nm, and II) of FIG. 3A shows the results of Comparative Example 2 and Example 2 using fumed silica having a particle size of about 14 nm.

FIG. 3A shows graphs from the test results of complex viscosities in accordance with the frequencies of exemplary phase-change fluids prepared in Comparative Examples 1 and 2 and Examples 1 and 2 according to exemplary embodiments of the present invention. As shown in FIG. 3A, the complex viscosities show a constant behavior at a low frequency band, and further show a non-Newtonian behavior at a high frequency band because the complex viscosity of the shear thickening fluid (STF) increases to be solid-like suspension.

Figure 3B:
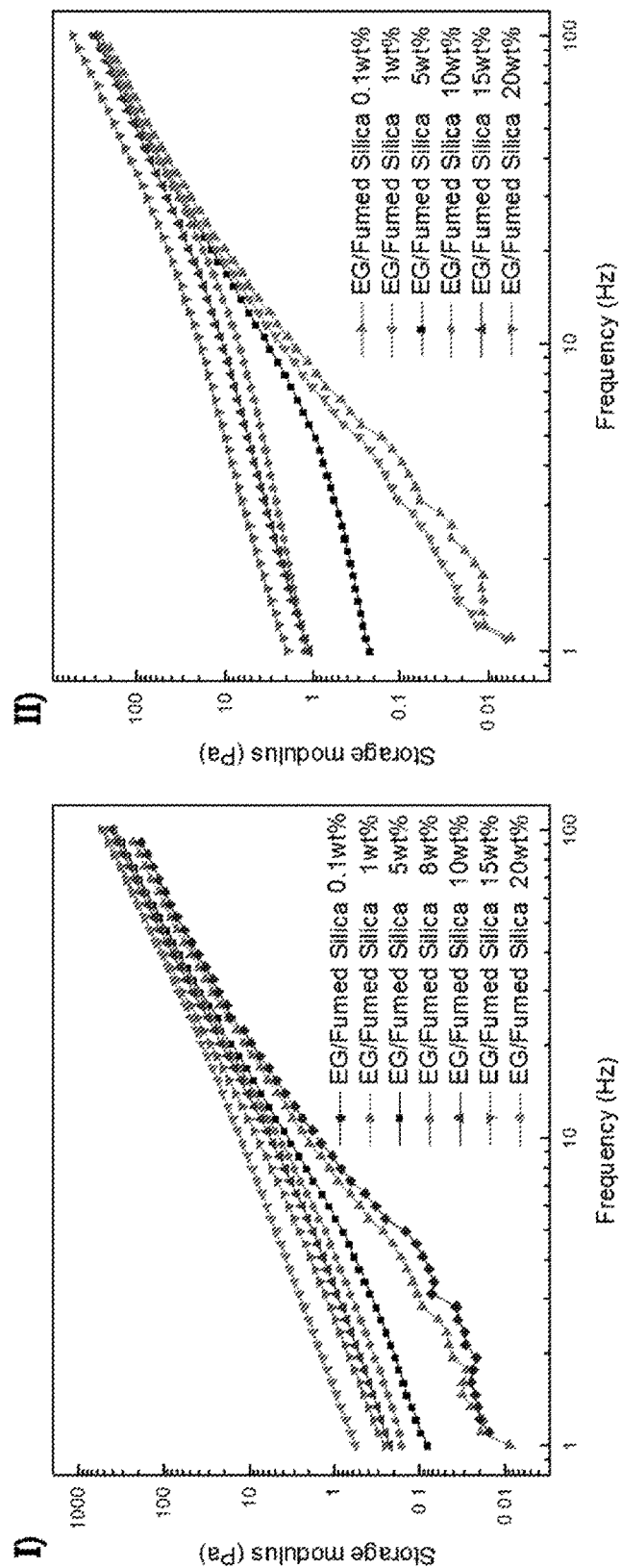
FIG. 3B shows graphs of storage modulus in accordance with the frequencies of exemplary phase-change fluids prepared in Comparative Examples 1 and 2 and Examples 1 and 2 according to exemplary embodiments of the present invention, where I) of FIG. 3B shows the results of Comparative Example 1 and Example 1 using fumed silica having a particle size of about 7 nm, and II) of FIG. 3B shows the results of Comparative Example 2 and Example 2 using fumed silica having a particle size of about 14 nm.

FIG. 3B shows the graphs of the storage modulus in accordance with the frequencies of exemplary phase-change fluids prepared in Comparative Examples 1 and 2 and Examples 1 and 2 and the spring characteristic of the phase-change fluid is shown.

Figure 3C:
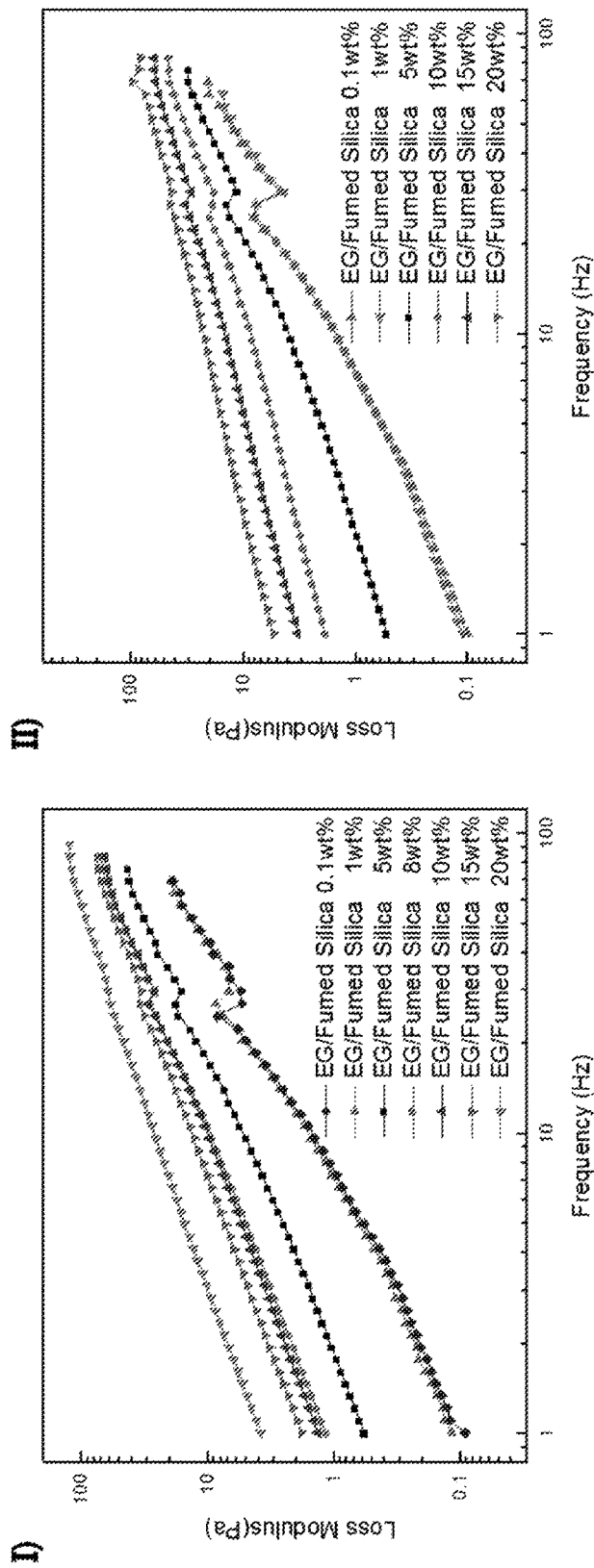
FIG. 3C shows graphs of loss modulus in accordance with the frequencies of exemplary phase-change fluids prepared in Comparative Examples 1 and 2 and Examples 1 and 2 according to exemplary embodiments of the present invention, where I) of FIG. 3C shows the results of Comparative Example 1 and Example 1 using fumed silica having a particle size of about 7 nm, and II) of FIG. 3C shows the results of Comparative Example 2 and Example 2 using fumed silica having a particle size of about 14 nm.

FIG. 3C shows graphs of the loss modulus in accordance with the frequencies of exemplary phase-change fluids prepared in Comparative Examples 1 and 2 and Examples 1 and 2 according to exemplary embodiments of the present invention and the viscosity characteristic of the phase-change fluid is shown.

Figure 4:
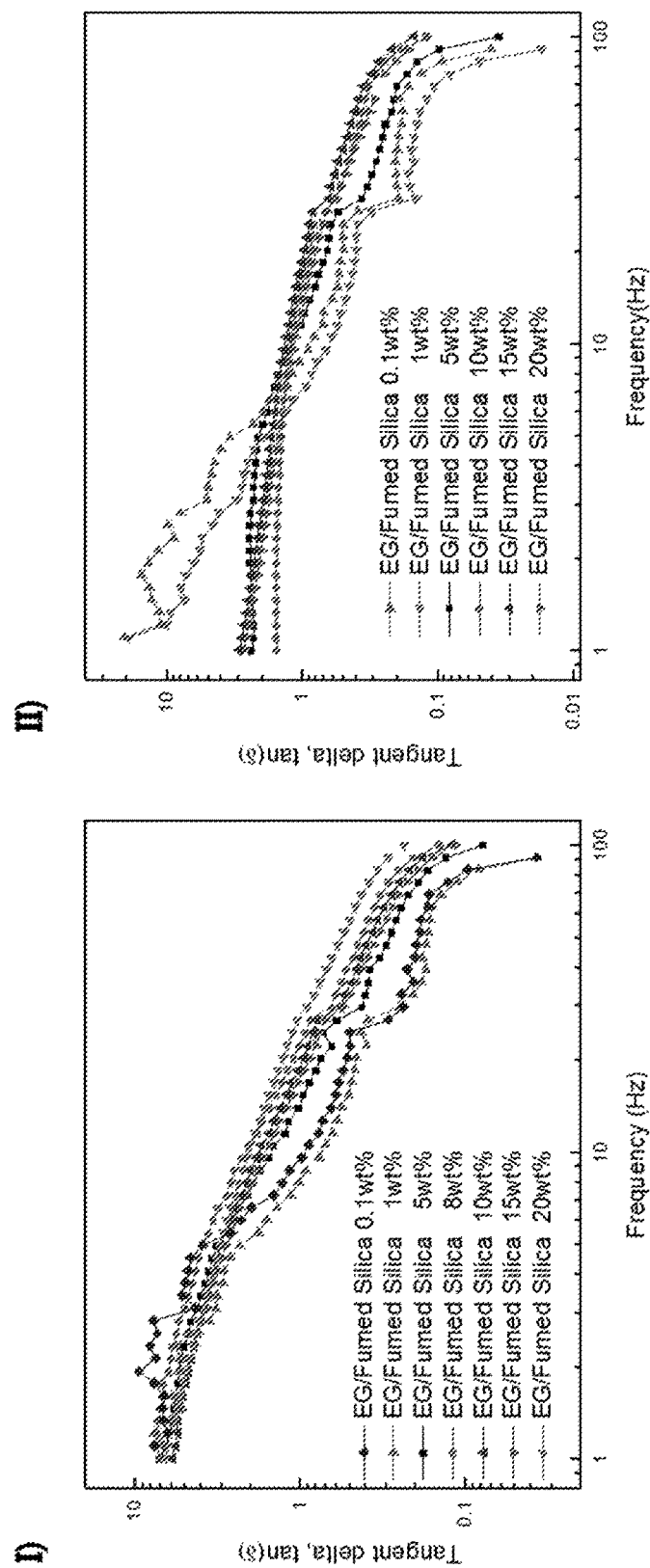
FIG. 4 shows graphs from test results of damping factors in accordance with the frequencies of exemplary phase-change fluids prepared in Comparative Examples 1 and 2 and Examples 1 and 2 according to exemplary embodiments of the present invention, where I) of FIG. 4 shows the results of Comparative Example 1 and Example 1 using fumed silica having a particle size of about 7 nm, and II) of FIG. 4 shows the results of Comparative Example 2 and Example 2 using fumed silica having a particle size of about 14 nm.

Finally, FIG. 4 shows graphs from the test results of damping factors in accordance with the frequencies of exemplary phase-change fluids prepared in Comparative Examples 1 and 2 and Examples 1 and 2 according to exemplary embodiments of the present invention. In detail, the viscosity characteristic is shown at greater than about 1 of a standard point, and the spring characteristic is shown at less than about 1 of a standard point.

Accordingly, the phase-change suspension fluid according to various exemplary embodiments of the present invention may have a constant Newtonian behavior at a low rate of shear or a low frequency band, and further may have a non-Newtonian behavior as a solid-like suspension at a high rate of shear or a high frequency band due to an increase in viscosity.

In other words, the present invention may provide an intelligent macromolecular dispersed fluid that has the advantages of a hydro bush in a low frequency band and the advantages of a solid type hush in a high frequency hand, and may reversibly change the phase in accordance with vibration of a vehicle. Therefore, the fluid according to the present invention may be applied for controllable variable attenuators, such as, suspension systems, isolators, and engine mounts, or the power plant, such as, brakes and clutches, and may also be widely applied for the vehicle industry and the aircraft industry.

Accordingly, the phase-change suspension fluid obtained from the present invention may be a fluid with the shear thickening flowing behavior such that the phase may reversibly change according to vehicle vibration and the compatible effect of the advantage of hydro bush at a low frequency band and the advantage of solid type bush at a high frequency band can be provided.

Therefore, the phase-change suspension fluid may actively control a vehicle so as to improve riding quality and handling performance, and thus, can be applied for controllable variable attenuators, such as, suspension systems, isolators, and engine mounts, or the power plant, such as, brakes and clutches, and can be also widely applied for the robot industry as well as the automotive industry and aviation industry.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for preparing a phase-change suspension fluid, comprising:
   (i) preparing a suspension fluid by adding and dispersing fumed silica particles in a solvent including one or more compounds selected from the group consisting of ethylene glycol and propylene glycol, and water;
   (ii) sonicating the suspension fluid; and
   (iii) removing air from the sonicated suspension fluid by placing the sonicated suspension fluid in a vacuum chamber.

2. The method of claim 1, wherein the step of (ii) for sonicating the suspension fluid is performed for about 9 to 12 hours.

3. The method of claim 1, wherein the step of (iii) for removing air is performed for about 9 to 12 hours.

* * * * *